United States Patent
Suzuki et al.

(10) Patent No.: US 8,619,286 B2
(45) Date of Patent: Dec. 31, 2013

(54) SYSTEM AND METHOD OF AVOIDING CONFLICTING PRINTER JOB LANGUAGE PROCESSING

(75) Inventors: Takahiko Suzuki, Ebina (JP); Tadashi Mimura, Ebina (JP); Yuji Onozawa, Saitama (JP); Hisashi Shirakawa, Ebina (JP); Koichiro Takahashi, Tokyo (JP); Kazuya Kawabata, Kawasaki (JP); Yoshifumi Kaneko, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 835 days.

(21) Appl. No.: 12/534,535

(22) Filed: Aug. 3, 2009

(65) Prior Publication Data
US 2010/0231954 A1    Sep. 16, 2010

(30) Foreign Application Priority Data
Mar. 10, 2009 (JP) .................. 2009-055910

(51) Int. Cl.
*G06F 3/12* (2006.01)
(52) U.S. Cl.
USPC .............................. 358/1.15; 358/1.1; 358/1.9
(58) Field of Classification Search
USPC ................... 358/1.1, 1.9, 1.15, 1.18, 401, 468
See application file for complete search history.

(56) References Cited

U.S. PATENT DOCUMENTS 6,373,588 B1 * 4/2002 Fischer et al. ............... 358/1.16
2007/0046969 A1   3/2007 Shinchi et al.

FOREIGN PATENT DOCUMENTS

| JP | 09-309247 A | 12/1997 |
| JP | 10-097395 A | 4/1998 |
| JP | 2002-328784 A | 11/2002 |
| JP | 2002-328786 A | 11/2002 |
| JP | 2003-029945 A | 1/2003 |
| JP | 2004-240850 A | 8/2004 |
| JP | 2007-58738 A | 3/2007 |

OTHER PUBLICATIONS

Japanese Office Action issued on Oct. 12, 2010 in the corresponding Japanese Patent Application No. 2009-055910.

* cited by examiner

*Primary Examiner* — Thomas D Lee
(74) *Attorney, Agent, or Firm* — Sughrue Mion, PLLC

(57) ABSTRACT

A printing control device includes: a banner data detecting unit that detects banner data from print data; a data acquiring unit that acquires, when the banner data are detected by the banner data detecting unit, data for designating a printing condition for printing a text located after the banner data in the print data; and a printing condition setting unit that sets, when the data for designating the printing condition for printing the text are acquired by the data acquiring unit, the printing condition as a printing condition for printing the print data.

8 Claims, 3 Drawing Sheets

SYSTEM AND METHOD OF AVOIDING CONFLICTING PRINTER JOB LANGUAGE PROCESSING

CROSS-REFERENCE TO RELATED APPLICATIONS

This application is based on and claims priority under 35 USC 119 from Japanese Patent Application No. 2009-055910 filed Mar. 10, 2009.

BACKGROUND

Technical Field

This invention relates to a printing control device, an image forming device, a printing control system and a computer readable medium.

SUMMARY

A printing control device includes: a banner data detecting unit that detects banner data from print data; a data acquiring unit that acquires, when the banner data are detected by the banner data detecting unit, data for designating a printing condition for printing a text located after the banner data in the print data; and a printing condition setting unit that sets, when the data for designating the printing condition for printing the text are acquired by the data acquiring unit, the printing condition as a printing condition for printing the print data.

BRIEF DESCRIPTION OF THE DRAWINGS

Exemplary embodiment(s) of the present invention will be described in detail based on the following figures, wherein.

DETAILED DESCRIPTION (Configuration of Image Forming Device)

First, the terms adopted in this specification will be explained. A "banner" in the specification refers to a routine document allotted to the front of the text of a printed item, a cover with routine printing, or a partition paper with routine printing. The banner is used as e.g. a partition between the texts of plural printed items or a title of the text of the printed item. "Banner data" refer to electronic data necessary to print this banner. The "PJL" (Print Job Language) refers to a program language for instructing the setting condition in printing such as the number of printed copies or the size (e.g. A4) of a printed item. The "PDL" (Page Description Language) refers to a page describing language which is a program language to instruct the formation of an image (plotting) in an image forming device. In this specification, the printing data contains text data and as the case may be, also contains the banner data. The banner data and the text data basically contain PJL and PDL. As the case may be, like a plain text, the printing don't contain PJL. If there is no banner, the printing data don't contain the banner data.

Figure 1:
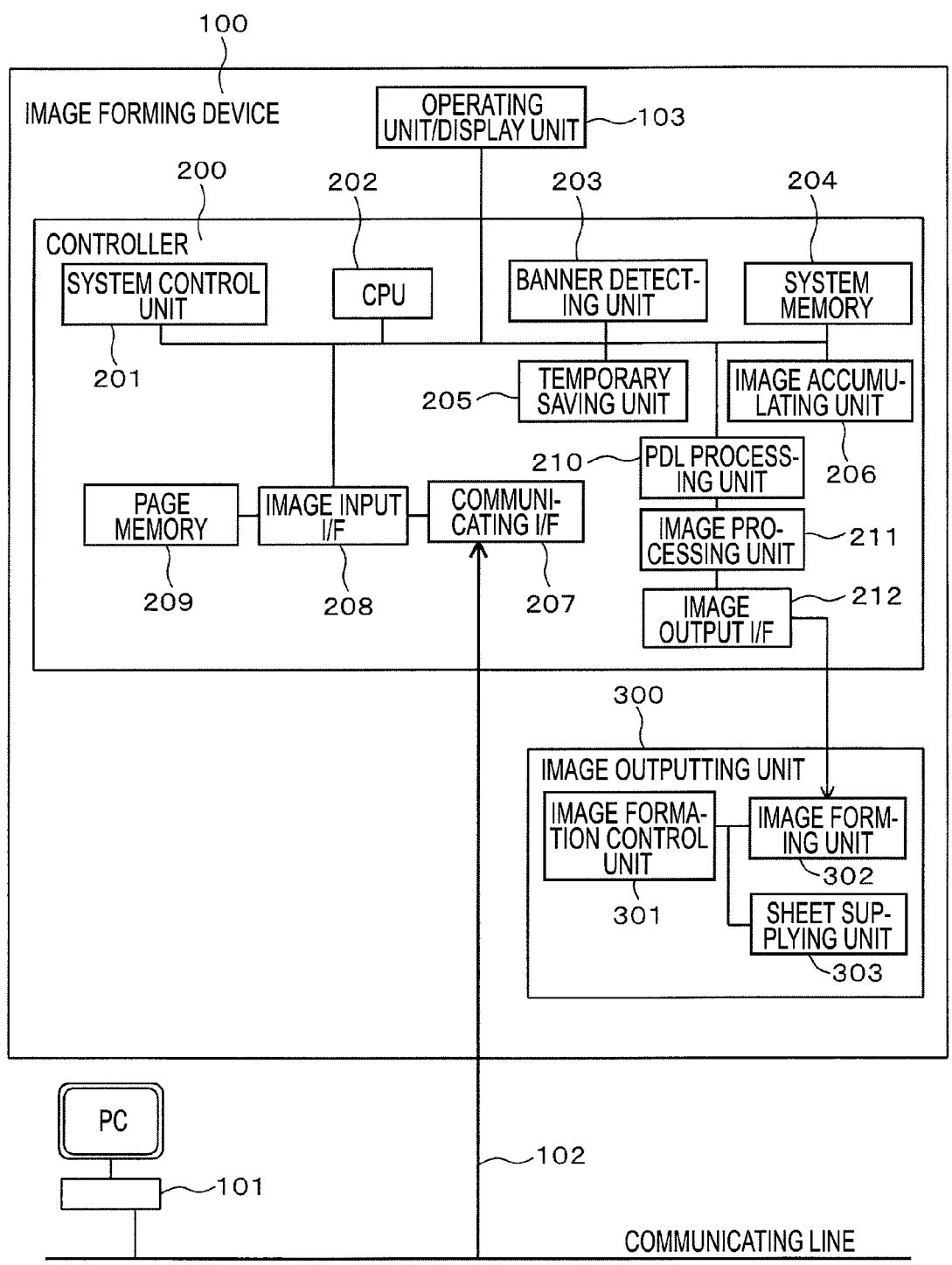
FIG. 1 is a block diagram of the image forming device according to an exemplary embodiment of this invention.

FIG. 1 is a block diagram of the image forming device according to an exemplary embodiment. An image forming device 100 is shown in FIG. 1. The image forming device 100 is connected to a personal computer 101 through a communicating line 102. The communicating line 102 is a network line such as LAN or a known communicating line. The personal computer 101 is an ordinary personal computer which is installed with known application software such as document forming software and driver software used in executing printing using the image forming device 100.

The image forming device 100 includes an operating unit/display unit 103. The operating unit/display unit 103 is a liquid-crystal display of a touch panel system which serves as an inputting unit for executing various operations for the image forming device 100 and an information displaying unit for displaying various kinds of information.

The image forming device 100 includes a controller 200 and an image outputting unit 300. The controller 200 has the function of a computer, which includes functions of controlling the entire operation of the image forming device 100, accepting printing data and outputting the printing data to the image outputting unit 300. The image outputting unit 300 forms an image on a recording medium on the basis of the control data outputted from the controller 200. The formation of the image on the recording medium refers to printing. The recording medium is generally paper, but may be made of resin such as an OHP sheet or paper with a coated surface.

(Configuration of Controller)

The controller 200 includes a system control unit 201, a CPU 202, a banner detecting unit 203, a system memory 204, a temporary saving unit 205 and an image accumulating unit 206. The system control unit 201 controls the operation of a power source, a motor, a heater, etc. within the image forming device 100. The CPU 202 executes the arithmetic processing necessary for the operation of the image forming device 100. The banner detecting unit 203, if the printing data accepted contain the banner data, detects them checking against a condition described later.

The system memory 204 functions as a working area in the operation executed by the CPU 202 or a buffer memory and stores an operation program for executing the operation described later and data necessary in executing the operation program. The temporary saving unit 205 temporarily stores setting items in the processing described later. The image accumulating unit 206 accumulates image data to be processed.

The controller 200 includes a communicating interface (communicating I/F) 207, an image input interface (image input I/F) 208 and a page memory 209. The communicating interface 207 has an interface function for executing the communication through the communicating line 102. The image input interface 208 accepts the printing data from the communicating interface 207. The page memory 209 buffers the printing data in data units for each page of sheets.

The controller 200 includes a PDL processing unit 210, an image processing unit 211 and an image output interface (image output I/F) 212. The PDL processing unit 210 interprets the PDL (Page Description Language) contained in the printing data to create data (plotting data) necessary to cause an image forming unit 302 to form an image. The image processing unit 211 executes, for the data outputted from the PDL processing unit 210, processing such as adjustment of the color gradation or contrast, reduction or enlargement of the image size and noise elimination. The output from the image processing unit 211 is sent to the image outputting unit 300 through the image output interface 212.

The image outputting unit 300 includes an image formation control unit 301, the image forming unit 302 and a sheet supplying unit 303. The image formation control unit 301 executes the control necessary to form the image. The image forming unit 302 forms the image on the sheet on the basis of the output from the controller 200. The image forming unit 302 includes a photosensitive drum forming a toner image on the sheet; a cleaning device for cleaning the photosensitive drum; an exposing device for executing exposure-to-light to form a latent image on the photosensitive drum, a developing device for developing the latent image by supplying toner to form a toner image on the photosensitive drum, a transfer device for transferring the toner image formed on the photosensitive drum to the sheet; and a fixing device for fixing the non-fixed toner image transferred onto the sheet by heating and pressurizing. The sheet supplying unit 303 supplies the sheet which is an image forming object to the image forming unit 302.

(An Example of the Operation: Summary)

An explanation will be given of an exemplary case where the operation of instructing the printing by the image forming device 100 is done in the personal computer 101. In this case, the printing data created within the personal computer 101 are sent to the image forming device 100 through the communicating line 102. The printing data are accepted by the image input interface 208 through the communicating interface 207. At this stage, the following processing will be executed by the controller 200.

Figure 2:
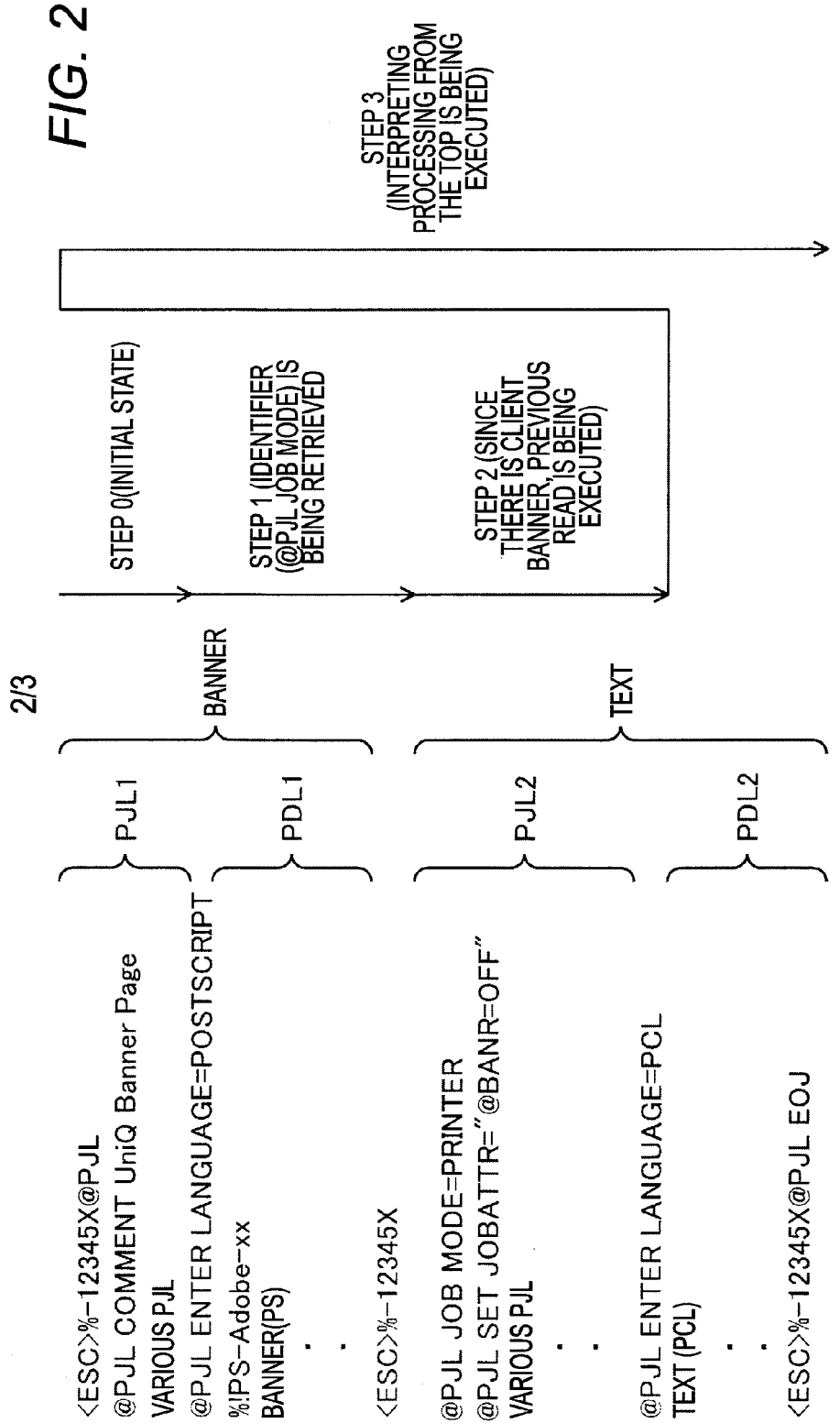
FIG. 2 is a conceptual view showing an example of a processing flow according to an exemplary embodiment of this invention.

First, the summary of the processing will be explained briefly. FIG. 2 is a conceptual view showing an example of the processing flow according to an exemplary embodiment of this invention. FIG. 2 shows an example in which the printing data are constructed of the banner and the text. As illustrated in FIG. 2, in the printing data, first, the data of the banner come and thereafter the data of the text come. These data are interpreted within the controller 200 so that the image is formed on the sheet in the image outputting unit 300.

Now, it is assumed that the banner is a routine cover. Now, the printing data of the banner consist of PJL1 and PDL1. PJL1 is data for designating the printing condition such as the number of printed copies and the kind of sheet relative to the banner. PDL1 is image data forming the image of the banner.

The printing data of the text consist of PJL2 and PDL2. PJL2 is a data for designating the number of printed copies and the kind of sheet relative to the text. PDL2 is image data forming the image of the text. The printing condition designated by PDL may be various kinds other than that described above, which will be described later.

Roughly, in this example, PJL1 which is PJL of the banner is read-skipped and, first, PJL2 which is PJL of the text is searched. Once PJL2 has been found, the setting item of PJL2 is stored in the temporary saving unit 205. Thereafter, returning to the top, PJL1 is ignored and PDL1 is interpreted. The printing based on PDL1 is executed by applying the condition designated by PJL2. Further, PDL2 is interpreted and the contents instructed by PDL2 are printed by applying the condition designated by PJL2.

According to this processing procedure, where the contents not designated by PJL1 are designated by PJL2, the designation of PJL2 is utilized in executing PDL2. This prevents occurrence of the situation where the setting designated in printing the text is made invalid and so not executed.

Hereinafter, referring to an example, this point will be described in detail. For example, assumed is processing of printing a printed item consisting of plural sheets and further binding these sheets by a stapler (In FIG. 1, the function of the stapler is not shown). In this case, in the operation by an ordinary image forming device, from the top of the data illustrated in FIG. 2, the data are read in the order of PJL1→PDL1→PJL2→PDL2 and sequentially interpreted.

In this case, it is assumed that in the setting of the printing condition of the banner, binding the printed item by the stapler is not designated, i.e. that PJL1 does not contain the data of binding the printed item by the stapler. In this case, in the ordinary mode where the data are read in the order of PJL1→PDL1→PJL2→PDL2 and sequentially interpreted, PJL1 of not designating the printed item by the stapler is valid and PJL2 becomes invalid; the condition designated by PJL1 is applied to the printing processing of PDL2. As a result, although a user has instructed to bind the printed item by the stapler as a setting item in printing the text, in an actual printing, the processing of binding the text by the stapler will not be executed.

In the system in which the banner is not printed, since there is not PJL1, PJL2 is valid so that this problem does not occur. Further, if the text is printed on the same condition as the printing condition of the banner, this problem does not occur. However, in the case of the setting using the banner, the above inconvenience may occur.

On the other hand, in the method shown in FIG. 2, PJL1 of the banner is read-skipped and ignored while the PJL2 of the banner is valid. Thus, setting of PJL2 is applied to execute PDL2. For this reason, in the setting of printing the banner, even when the user sets the condition different from the banner in printing the text, the text with the set contents applied can be printed.

Now, as the item designated by PJL (Print Job Language), an exemplary case has been explained in which the setting of binding the printed item by the stapler is done in printing the text. However, the items designated by PJL include selection of the number of printed copies, selection of the sheet supplying device where there are plural sheet supplying devices, selection of the sheet ejecting device where there are plural sheet ejecting devices, formation of a reduced image and thumbnail images, security printing, setting of direct facsimile, setting of sample printing, setting of a printing time, setting of double-sided printing, selection of a sheet size, setting or adjustment of printing quality, setting of punch-folding, selection of a color mode, and setting of certification designation. A plurality of setting items can be set simultaneously.

Now, the security printing refers to a printing mode in which after the user operates the personal computer 101 to instruct the image forming device 100 to execute printing, if he does not go to the image forming device 100 side to enter a password, an actual printed item is not outputted. The security printing is the printing mode such as printing of a confidential document in which only the user specially permitted can see the printed contents. The direct facsimile refers to a function in which simultaneously when the printing is done, the facsimile having the same contents as the printed contents can be transmitted to a designated party. The sample printing refers to a trial printing mode in which for example, when the quality of color printing is confirmed, only one sheet is printed.

It should be noted that since PJL1 is not applied to the printing processing of the banner, PJL2 or predetermined setting is applied to the printing processing of the banner.

As described above, in this example, when the printing data including the banner and text are accepted, the printing condition of the banner is read-skipped and the printing condition of the text is previously read to make such a setting that the printing condition of the text is applied to printing of the text. This can solve the problem that the printing condition of the banner is applied to printing of the text, and where the printing condition different from the banner is set for the text, this setting becomes invalid.

(Example of the Operation: Details)

Figure 3:
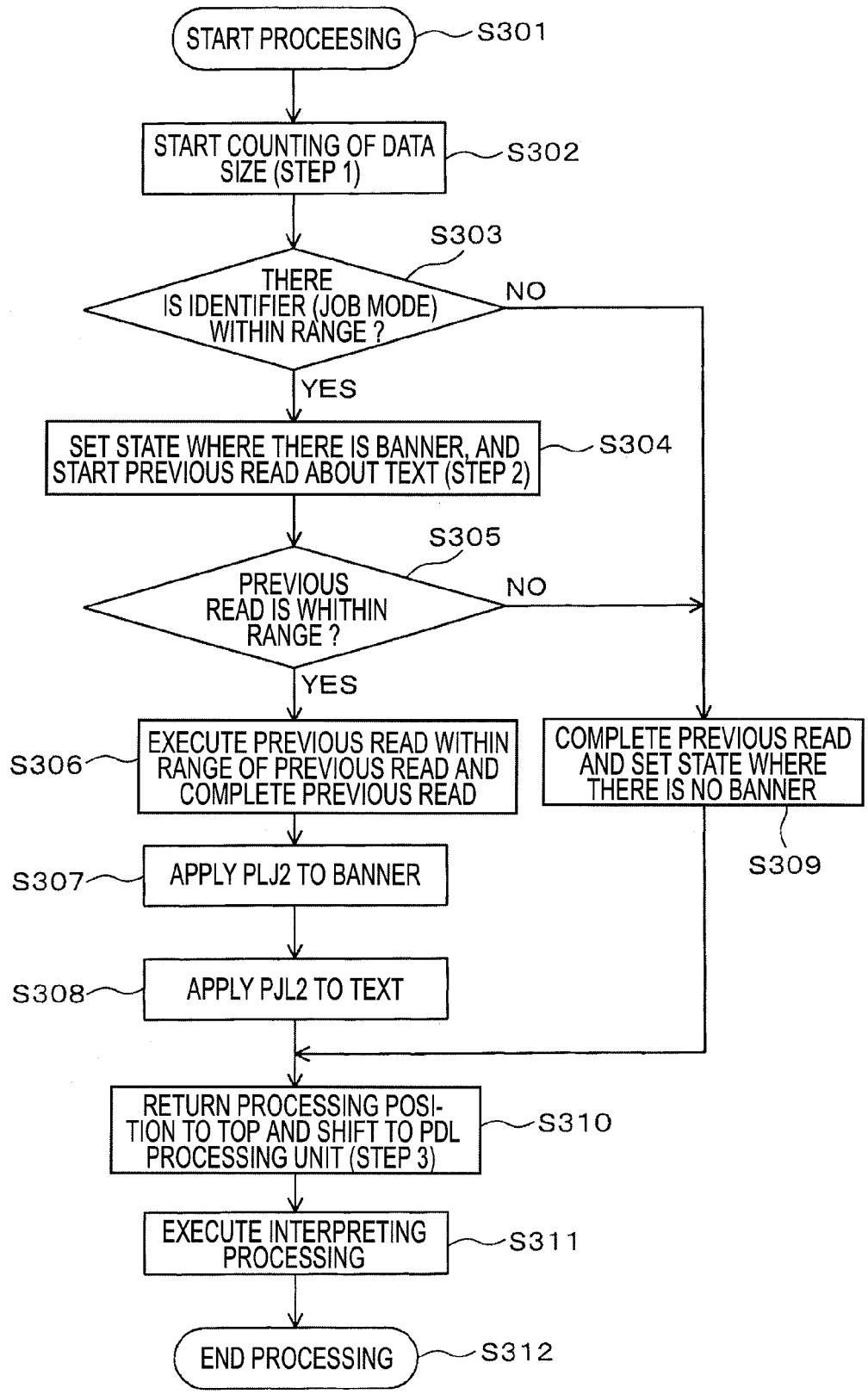
FIG. 3 is a flowchart showing an example of the processing procedure according to an exemplary embodiment of this invention.

A detailed concrete example of the processing shown in FIG. 2 will be explained. Now it is assumed that the in order to execute the printing by the image forming device 100, the personal computer 101 is operated so that the printing data are transmitted from the personal computer 101 to the image forming device 100 through the communicating line 102. First, when the controller 200 accepts the printing data from the personal computer 101, the execution of the processing shown in FIG. 3 is started. FIG. 3 is a flowchart showing an example of the processing procedure.

When the processing is started (step S301), counting of the data size of the printing data is started (step S302). Next, it is determined whether or not the identifier ("JOB MODE" in this case) indicative of the data of the text is within a predetermined range (step S303). The predetermined range in step S303 is a certain range from the top of the data exclusive of the top thereof. The rear end of this range is determined by a standard of the maximum quantity of the banner data handled. This range is limited for the purpose of avoiding a situation in which in the case of the printing data having no PJL such as the plain text, redundant processing is done to reduce processing efficiency.

Where the identifier indicative of the data of the text is detected within the predetermined range, if there are the data other than the data (PJL) designating the printing condition in front of the identifier, it is determined that there are the banner data so that the state where there is the banner is stored and further, read of PJL2 in FIG. 2 is started (step S304). This read starts read of PJL2 previously to that of PJL1 so that it is expressed as "previous read".

For example, in the case of FIG. 2, "@PJL JOB MODE=PRINTER" is the identifier added to the top of the text data. In front of this identifier, there is PDL1 starting with "@PJL ENTER LANGUAGE=POSTSCRIPT". This PDL is not the PJL data. So, in this case, it is determined that there is the banner.

If there is not the banner, the processing proceeds to step S309. In step S309, the previous read of PJL2 is completed (if the previous reading is being executed) and the state where there is not the banner is stored.

After step S304, the processing proceeds to step S305. In step S305, it is determined whether or not the data quantity of PJL2 whose previous read is started in step S304 is within the range of predetermined data quantity (step S305). If the data quantity of PJL2 being previously read exceeds the range of the predetermined data quantity, the processing proceeds to step S309. On the other hand, at the time when the previous read of PJL2 is completed, if the data quantity read does not the range of the predetermined data quantity, the processing proceeds to step S306. Step S305 is executed in order to avoid the situation where the time of processing is prolonged to reduce the processing efficiency.

The previous read of PJL2 is continued until (@PJL ENTER LANGUAGE=PCL) which is an ending condition is found or the text is found. Once the previous read of PJL2 is completed (step S306), setting of application of the condition designated by PJL2 to printing of the banner is made (step S307). Further, setting of application of the condition designated by PJL2 to printing of the text is made (step S308). These setting contents are stored (saved) in the temporary saving unit 205.

After step S308, the processing position on a string of data is returned to the top of the printing data so that the image data are transferred to the PDL processing unit 210 (step S310). Further, the processing of interpreting PDL1 and PDL2 is executed (step S311). Thus, the processing is ended (step S312). It should be noted that the control data acquired by interpreting PDL1 and PDL2 (control data for plotting) are transferred to the image forming unit 302 of the image outputting unit 300. The image forming unit 302 executes the processing of forming the image on the sheet supplied from the sheet supplying unit 303.

Where the processing proceeds from step S309 to step S310, in step S311, the ordinary processing of reading from the top of the data is executed.

(Other Examples)

The processing to step S308 may be executed by the personal computer 101 or a printer server (not shown). This invention may be also applied to an image forming system having a structure in which the portion corresponding to the controller 200 is separated from the image outputting unit. In these cases, this invention is understood as the invention of a system. The program of FIG. 3 may be provided from a suitable medium storing it.

In step S307 in FIG. 3, a predetermined setting condition may be adopted as PJL which is applied to the banner. In this case, the processing of the setting for the text (PJL2) not affecting the printing of the banner is executed. For example, even if executing the stapler processing is set for the text, the processing of not applying it to the banner is executed.

Design may be made to be capable of turning OFF the function of previously reading the printing condition of the text and ignoring the printing condition of the banner. In this case, by operating the operating unit/display unit 103, this function is turned OFF. Once this function is turned OFF, as regards the case of the example of FIG. 2, the data are read in the order of PJL→PDL1→PJL2→PDL2. The setting of PJL1 interpreted in the first place is applied to execute printing of the contents designated by PDL1 and PDL2.

This invention can be applied to an image forming device, a system including the image forming device and a program for operating them.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control device comprising:
a banner data detecting unit that detects banner data from print data, the print data comprising the banner data, a banner printing condition that designates a printing condition for printing the banner, text located after the banner data in the print data, and a text printing condition for printing the text, wherein the data detecting unit determines whether (i) an identifier indicating a beginning of the text printing condition added to a top of the text printing condition is detected in a predetermined limited range which is determined by considering the maximum quantity of the banner data to be handled and whether (ii) any data except for data designating the printing condition is detected in front of the identifier and detects the banner data if it is determined that the identifier is detected in the predetermined limited range and the data except for the data designating the printing condition is detected in front of the identifier;

a data acquiring unit that, when the banner data is detected by the banner data detecting unit, skips the banner printing condition and acquires the text printing condition for printing the text; and a printing condition setting unit that sets, when the text printing condition for printing the text is acquired by the data acquiring unit, the text printing condition as a printing condition for printing the text.

2. The printing control device according to claim 1, wherein a range to be detected by the banner data detecting unit is limited.

3. The printing control device according to claim 1, wherein the printing condition setting unit sets, when the text printing condition for printing the text is acquired by the data acquiring unit, the banner printing condition to be the text printing condition.

4. The printing control device according to claim 1, wherein the printing condition setting unit sets, when the text printing condition for printing the text is acquired by the data acquiring unit, the banner printing condition to be a predetermined printing condition.

5. The printing control device according to claim 1, wherein the printing condition setting unit sets the text printing condition to be one or plural items selected from stapler processing, selection of the number of printed copies, selection of a sheet supplying device where there are plural sheet supplying devices, selection of a sheet ejecting device where there are plural sheet ejecting devices, selection of a reduced image, formation of thumbnail image, security printing, setting of direct facsimile, setting of sample printing, setting of a printing time, double-sided printing, selection of a sheet size, setting or adjustment of printing quality, punch-folding, selection of a color mode and certification designation.

6. An image forming device comprising:
a printing control device, the printing control device comprising:
a banner data detecting unit that detects banner data from print data, the print data comprising the banner data, a banner printing condition that designates a printing condition for printing the banner, text located after the banner data in the print data, and a text printing condition for printing the text, wherein the data detecting unit determines whether (i) an identifier indicating a beginning of the text printing condition added to a top of the text printing condition is detected in a predetermined limited range which is determined by considering the maximum quantity of the banner data to be handled and whether (ii) any data except for data designating the printing condition is detected in front of the identifier and detects the banner data if it is determined that the identifier is detected in the predetermined limited range and the data except for the data designating the printing condition is detected in front of the identifier;

a data acquiring unit that, when the banner data is detected by the banner data detecting unit, skips the banner printing condition and acquires the text printing condition for printing the text; and a printing condition setting unit that sets, when the text printing condition for printing the text is acquired by the data acquiring unit, the text printing condition as a printing condition for printing the text; and an image forming unit that is controlled by the printing control device to form an image on a recording medium.

7. A printing control system comprising:
a banner data detecting unit that detects banner data from print data, the print data comprising the banner data, a banner printing condition that designates a printing condition for printing the banner, text located after the banner data in the print data, and a text printing condition for printing the text, wherein the data detecting unit determines whether (i) an identifier indicating a beginning of the text printing condition added to a top of the text printing condition is detected in a predetermined limited range which is determined by considering the maximum quantity of the banner data to be handled and whether (ii) any data except for data designating the printing condition is detected in front of the identifier and detects the banner data if it is determined that the identifier is detected in the predetermined limited range and the data except for the data designating the printing condition is detected in front of the identifier;

a data acquiring unit that, when the banner data is detected by the banner data detecting unit, skips the banner printing condition and acquires the text printing condition for printing the text; and a printing condition setting unit that sets, when the text printing condition for printing the text is acquired by the data acquiring unit, the text printing condition as a printing condition for printing the text.

8. A non-transitory computer readable medium storing a program causing a computer to execute a process for setting a printing condition:
detecting banner data from print data, the print data comprising the banner data, a banner printing condition that designates a printing condition for printing the banner, text located after the banner data in the print data, and a text printing condition for printing the text, wherein the detecting the banner data from the print data comprises determining whether (i) an identifier indicating a beginning of the text printing condition added to a top of the text printing condition is detected in a predetermined limited range which is determined by considering the maximum quantity of the banner data to be handled and whether (ii) any data except for data designating the printing condition is detected in front of the identifier and detecting the banner data if it is determined that the identifier is detected in the predetermined limited range and the data except for the data designating the printing condition is detected in front of the identifier;

when the banner data is detected, skipping the banner printing condition and acquiring the text printing condition for printing the text; and setting, when the text printing condition for printing the text is acquired, the text printing condition as a printing condition for printing the text.

* * * * *